United States Patent Office 3,382,249
Patented May 7, 1968

3,382,249
1,2,3,4,5,6 - HEXAHYDRO - 3- (CYCLOALKYL - LOWER ALKYLENE - ) - 2,6 - METHANO - 3 - NAPHTH [2,1-f]AZOCINES
Noel F. Albertson, East Greenbush, N.Y., assignor to Sterling Drug Inc., New York, N.Y., a corporation of Delaware
No Drawing. Filed Oct. 20, 1964, Ser. No. 405,244
9 Claims. (Cl. 260—293)

ABSTRACT OF THE DISCLOSURE 1,2,3,4,5,6 - hexahydro-3-(cycloalkyl - lower alkylene-)-6 - ($R^1$) - 13 - ($R^2$)-2,6-methano-3-naphth[2,1-f]azocines wherein $R^1$ is lower alkyl and $R^2$ is hydrogen and lower alkyl have pharmacodynamic activity and are useful as anti-convulsants and as analgesic antagonists. These compounds are prepared from the corresponding 3-(H—) secondary amines, the latter being obtained from dihydro- and tetrahydro-pyridine intermediates.

This invention relates to chemical compositions of matter classified as 1,2,3,4,5,6-hexahydro-2,6-methano-3-benzazocines and 1,2,3,4,5,6-hexahydro - 2,6 - methano-3-naphth[2,1-f]azocines, to intermediates therefor, and to the preparation of the same.

In its composition aspect, the invention sought to be patented resides in the concept of 1,2,3,4,5,6-hexahydro-6-lower alkyl-2,6-methano-3-benzazocines and 1,2,3,4,5,6-hexahydro - 6 - lower alkyl-2,6-methano-3-naphth[2,1-f] azocines in which the nitrogen atom thereof bears the monovalent hydrocarbon radical cycloalkyl-lower alkylene-, and in which in the 11-position of the benzazocines and in the 13-position of the naphthazocines is optionally attached lower alkyl. My new compounds have the structural formulas.

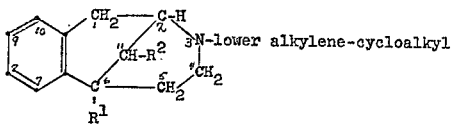

Formula I and

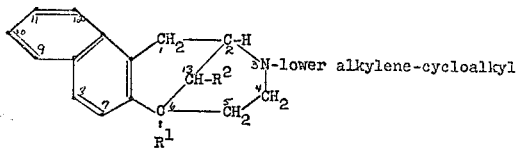

Formula II wherein $R^1$ is lower alkyl and $R^2$ is a member of the group consisting of hydrogen and lower alkyl.

As used herein, the term "lower alkyl" means in each instance monovalent radicals of relatively low molecular weight derived from saturated branched and unbranched aliphatic hydrocarbons; the preferred alkyl radicals have 1–4 carbon atoms as illustrated by, but not limited to, methyl, ethyl, n-propyl, isopropyl, and n-butyl. The term "lower alkylene" means bivalent radicals derived from saturated aliphatic hydrocarbons of relatively low molecular weight by removal of two hydrogens from one or two carbon atoms thereof; the preferred lower alkylene radicals have 1–4 carbon atoms, as illustrated by, but not limited to —$CH_2$—, —$CH_2CH_2$—, —$CH_2CH_2CH_2$—, —$CH_2$—CH($CH_3$)—, and —$CH_2CH_2CH_2CH_2$—. The term "cycloalkyl" means monovalent radicals derived by removal of one atom of hydrogen from saturated monocyclic hydrocarbons; the preferred cycloalkyl radicals have 3–6 ring carbon atoms, as illustrated by, but not limited to, cyclopropyl, cyclobutyl, 3,3-dimethylcyclobutyl, cyclopentyl, and cyclohexyl.

The new compounds of this invention are typically high-boiling liquids which form high-melting, white crystalline hydrochlorides and which have pharmacodynamic activity and are useful as anticonvulsants and as antagonists of certain strong analgesic agents, such as morphine and meperidine.

In accordance with the process aspect of the instant invention, my new compounds are conveniently obtained by N-acylating 1,2,3,4,5,6-hexahydro-6-($R^1$)-11-($R^2$)-2,6-methano-3-benzazocine or 1,2,3,4,5,6-hexahydro-6-($R^1$)-13 - ($R^2$) - 2,6 - methano-3-naphth[2,1-f]azocine with one molecular equivalent of an acylating agent which is a member of the group consisting of acid halides and acid anhydrides of cycloalkanoic acids and cycloalkyl-lower alkanoic acids and reducing the resulting amide product, which contains a 3-cyclopropanecarbonyl or a 3-cyclopropyl-lower alkanoyl group, by treatment with a reducing agent effective to reduce the carbonyl of the amide to —$CH_2$—, for instance lithium aluminum hydride or equivalent thereof.

My new compounds can exist in stereochemically isomeric forms, that is, optical isomers and geometric isomers. When desired, the isolation or the production of a particular stereochemical form can be accomplished by application of the general principles known in the prior art.

Due to the presence of a basic tertiary amino grouping, the compounds of this invention react with organic and inorganic acids to form acid-addition salts. These acid-addition salts are prepared from any organic acid, inorganic acid (including organic acids having an inorganic group therein), or organo-metallic acid as exemplified by organic mono- and poly-carboxylic acids such as found, for example, in Beilstein's Organische Chemie, 4th ed., volumes III, IV, IX, X, XIV, XVII, XIX, XXI, XXII, and XXV; organic mono- and polysulfonic acid-sulfinic acids such as found, for example in Beilstein volumes VI, XI, XVI, and XXII; organic phosphonic and phosphinic acids such as found, for example in Beilstein volumes XI and XVI; organic acids of arsenic and antimony such as found, for example, in Beilstein volume XVI; organic heterocyclic carboxylic, sulfonic, and sulfinic acids such as found, for example in Beilstein volumes XVIII, XXII, and XXV; acidic ion-exchange resins; and inorganic acids of any acid forming element or combination of elements such as found in Mellor, Comprehensive Treatise on Inorganic and Theoretical Chemistry, Longman's, Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare the acid-addition salt forms of the compounds of this invention. Thus there are also included acidic phenolic compounds such as found, for example, in volume VI of Beilstein, acidic compounds having "activated" or acidic hydrogen atoms, as for example, picrolonic acid, or barbituric acid derivatives having an acidic proton such as found, for example, in Cox et al., Medicinal Chemistry, vol. IV, John Wiley and Sons, Inc., New York, NY. (1959).

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, glutamic acid, tartaric acid, oxalic acid, pyromucic acid, citric acid, lactic acid, glycolic acid, gluconic acid, succharic acid, ascorbic acid, penicillin, benzoic acid, phthalic acid, salicylic acid, 3,5-dinitrobenzoic acid, anthranilic acid, cholic acid, 2-pyridinecarboxylic acid, pamoic acid, 3-hydroxy-2-naphthoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, butylarsonic acid, methane phosphonic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, arsenic acid, and the like. The acid-addition salts with lactic acid and with ethanesulfonic acid, for example, are water-soluble.

The acid-addition salts are prepared in conventional fashion, for instance either by direct mixing of the acid and the free base form or, when this is not appropriate, by dissolving either or both of the acid and the free base form separately in water or an organic solvent and mixing the two solutions, or by dissolving both the acid and the free base form together in a solvent. The resulting acid-addition salt is isolated by filtration, if it is insoluble in the reaction medium, or by evaporation of the reaction medium to leave the acid-addition salt as a residue. The acid moities or anions in these salt forms are in themselves neither novel nor critical and therefore can be any acid anion or acid-like substance capable of salt formation with the free base form of my compounds.

The acid-addition salt forms of my new compounds are useful not only as anticonvulsants and as antagonists of certain strong analgesic agents, as above-indicated, but are also useful for characterizing and identifying purposes, and in isolation or purification procedures. Moreover, the acid-addition salts are sources of the free base forms, for instance by reaction with strong bases, and accordingly all of the acid-addition salts, regardless of considerations of solubility, toxicity, physical form, or the like of a particular salt, are useful for the purposes of my invention.

It will be appreciated from the above that if one or more of the characteristics, such as solubility, molecular weight, physical appearance, toxocity, or the like of a given free base or acid-addition salt form of a particular compound render that form less suitable for the purpose at hand, it can be readily converted to another, more suitable form.

INTERMEDIATES

The 1,2,3,4,5,6 - hexahydro - 6 - ($R^1$) - 11 - ($R^2$) - 2,6-methano - 3 - benzazocine and the 1,2,3,4,5,6 - hexahydro-6 - ($R^1$) - 13 - ($R^2$) - 2,6 - methano - 3 - naphth[2,1-f]-azocine starting materials for the preparation of the compounds of this invention can be obtained by application of generally known procedures. Thus, to obtain the starting materials for the compounds of Formula I, 3-($R^2$)-4-($R^1$)-pyridine methiodide is interacted with p-methoxybenzylmagnesium chloride; the resulting N methyl-2-(p-methoxybenzyl) - 3 - ($R^2$) - 4 - ($R^1$) - 1,2 - dihydropyridine is reduced with sodium borohydride or by catalytic hydrogenation to produce N-methyl-2-(p-methoxybenzyl) - 3 - ($R^2$) - 4 - ($R^1$) - 1,2,5,6 - tetrahydropyridine; and this latter product is heated with an appropriate cyclizing agent, such as concentrated hydrobromic or phosphoric acid to yield a mixture of the racemic cis (also termed the α or "normal" series) and the racemic trans (also termed the β or "iso" series) forms of 1,2,3, 4,5,6-hexahydro - 3 - methyl - 6 - ($R^1$) - 11 - ($R^2$) - 2,6-methano-3-benzazocine. The 3-methyl group is removed by treatment with cyanogen bromide to produce the corresponding 3-cyano compound which is converted by heating with dilute hydrochloric acid to the cis and trans forms of 1,2,3,4,5,6 - hexahydro - 6 - ($R^1$) - 11 - ($R^2$)-2,6-methano-3-benzazocine. The cis and trans forms of these compounds are readily separated, if desired, by use of conventional techniques, for instance by fractional crystallization or by column chromatography; and, if desired, the racemic forms can be resolved by conventional methods into their optically active components. The benzazocine compounds thus obtained as well as the pyridines, dihydropyridines, and tetrahydropyridines intermediate thereto are all old classes of compounds.

To obtain the novel intermediates for the compounds of Formula II, 3-($R^2$)-4-($R^1$)-pyridine methiodide is interacted with 1-naphthylmethylmagnesium chloride; the resulting N-methyl-2-(1-naphthylmethyl)-3-($R^2$)-4-($R^1$)-1, 2-dihydropyridine is reduced with sodium borohydride or by catalytic hydrogenation to produce N-methyl-2-(1-naphthylmethyl)-3-($R^2$)-4-($R^1$) - 1,2,5,6 - tetrahydropyridine; and this latter product is heated with an appropriate cyclizing agent, such as concentrated hydrobromic or phosphoric acid, to yield a mixture of the racemic cis and the racemic trans forms of 1,2,3,4,5,6-hexyhydro-3-methyl-6-($R^1$)-13($R^2$)-2,6-methano-3 - naphth[2,1-f]azocine. The 3-methyl group is removed by treatment with cyanogen bromide to produce the corresponding 3-cyano compound which is converted by heating with dilute hydrochloric acid to the cis and trans forms of 1,2,3,4,5,6-hexahydro-6-($R^1$)-13-($R^2$)-2,6-methano-3 - naphth[2,1-f]azocine. The separation of cis and trans forms and resolution of racemic form is readily accomplished, if desired, by conventional techniques. The naphthazocine products thus obtained and the pyridines, dihydropyridines, and tetrahydropyridines intermediate thereto are all novel classes of compounds which form aspects of the instant invention.

By alternative system of nomenclature, the benzazocine compounds of Formula I are designated as benzomorphan derivatives, that is, as 2-(cycloalkyl-lower alkylene)-5-($R^1$)-9-($R^2$)-6,7-benzomorphans.

The structures of the compounds of this invention followed from the methods of synthesis which were used and from the elementary analyses of the products obtained.

My invention is illustrated by the following examples without, however, being limited thereto.

Example 1.—1,2,3,4,5,6-hexahydro-3-cyclopropyl-methyl-6,11-dimethyl-2,6-methano-3-benzazocine A. To a stirred mixture of 8.0 g. of racemic 1,2,3,4,5,6-hexahydro-cis-6,11-dimethyl-2,6-methano-3 - benzazocine (which is known also as racemic cis-5,9-dimethyl-6,7-benzomorphan) dissolved in 80 ml. of chloroform and 6 ml. of triethylamine there was added dropwise at room temperature 4.5 g. of cyclopropanecarbonyl chloride. The reaction mixture was stirred for two hours and was then washed in a separatory funnel successively with water, dilute hydrochloric acid, and water. The chloroform layer was concentrated under reduced pressure to yield 10.9 g. of racemic 1,2,3,4,5,6-hexahydro-3-cyclopropanecarbonyl-cis-6,11-dimethyl-2,6-methano-3-benzazocine. To a suspension of this product in tetrahydrofuran there was added 4 g. of lithium aluminum hydride in tetrahydrofuran and the resulting mixture was stirred and refluxed for approximately five hours. The reaction mixture was mixed with 8 ml. of water and a few ml. of diethyl ether and the mixture was filtered. The residue was extracted with hot tetrahydrofuran, and this extract and the filtrate were combined and concentrated to yield a residue which weighed 7.4 g. Water and 3 ml. of hydrochloric acid were added to this residue and the mixture was extracted with diethyl ether, the ethereal layer being then discarded. Ammonium hydroxide was added to the aqueous layer and the mixture was extracted with diethyl ether. The ethereal extract was dried and concentrated to yield 6.8 g. of a yellow oil. This oil was distilled under reduced pressure. The fraction distilling at 119–122° C. at 0.8 mm. pressure weighed 6.0 g. This product, which was racemic 1,2,3,4,5, 6-hexahydro-3-cyclopropylmethyl-cis-6-11-dimethyl - 2,6- methano-3-benzazocine, having the molecular formula $C_{18}H_{25}N$, was converted to its hydrochloride. After recrystallization from isopropyl alcohol-diethyl ether, this hydrochloride was obtained as white crystals which weighed 4.5 g. and melted at 249–251° C. The hydrochloride was soluble in a mixture of 0.42 ml. of N/2 hydrochloric acid and 0.58 ml. of water to the extent of 1 percent, the pH of the 1 percent solution being 1.5; and when the pH of the 1 percent solution was gradually raised by addition of N/10 sodium hydroxide solution, no precipitate formed at pH 7.0.

B. Following the procedure of part A of this example but using the dextro form in one instance, and the levo form in another instance, of 1,2,3,4,5,6-hexahydro-cis-6,11-dimethyl-2,6-methano-3-benzazocine (resolved into the dextro and levo forms using d- and l-tartaric acids) instead of the racemic form used in part A, the respective final products are the dextro- and the levo-forms of 1,2,3,4,5,6-hexahydro-3-cyclopropylmethyl-cis - 6,11 - dimethyl-2,6-methano-3-benzazocine.

Example 2.—1,2,3,4,5,6-hexahydro-3-cyclopropylmethyl-6,11-dimethyl-2,6-methano-3-benzazocine Following a procedure similar to that described in Example 1A hereinabove, 6.0 g. of racemic 1,2,3,4,5,6-hexahydro-trans-6,11-dimethyl-2,6-methano-3-benzazocine was N-acylated with 3.3 g. of cyclopropanecarbonyl chloride to yield 7.9 g. of racemic 1,2,3,4,5,6-hexahydro-3-cyclopropanecarbonyl - trans - 6,11 - dimethyl-2,6-methano-3-benzazocine. This amide (7.9 g.) was reduced for five hours with lithium aluminum hydride (3 g.) to yield racemic 1,2,3,4,5,6-hexahydro - 3 - cyclopropylmethyl-trans-6,11-dimethyl-2,6-methano-3 - benzazocine, having the molecular formula $C_{18}H_{25}N$. This base was converted to its hydrobromide, a white crystalline solid which weighed 3.1 g. and melted at 238–240° C. The solubility of the hydrobromide in water was less than 0.25 percent; and its solubility in 95 percent ethyl alcohol was less than 1 percent (w./v.).

Example 3.—1,2,3,4,5,6-hexahydro-3-cyclopropylmethyl-6-ethyl-11-methyl-2,6-methano-3-benzazocine Following a procedure similar to that described in Example 1A hereinabove, 9.0 g. of racemic 1,2,3,4,5,6-hexahydro-cis-(6-ethyl-11-methyl)-2,6-methano - 3 - benzazocine was N-acylated with 4.4 g. of cyclopropanecarbonyl chloride to yield 11.9 g. of racemic 1,2,3,4,5,6-hexahydro-3-cyclopropanecarbonyl - cis - (6-ethyl-11-methyl) - 2,6-methano,3-benzazocine as a yellow oil. This amide (11.8 g.) was reduced for four hours with lithium aluminum hydride (2 g.) in tetrahydrofuran to yield 1,2,3,4,5,6-hexahydro-3-cyclopropylmethyl-cis-(6-ethyl-11 - methyl)-2,6-methano-3-benzazocine. This base was converted to its hydrochloride, a white crystalline solid which weighed 3.8 g. and melted at 243–249° C. The solubility of the hydrochloride in water was 20 percent. The pH of a 1 percent solution of the hydrochloride was 5.6; when the pH of this solution was adjusted to 6.5 by addition of N/10 sodium hydroxide solution, a precipitate formed.

Example 4.—1,2,3,4,5,6 - hexahydro - 3-cyclobutylmethyl-6,11-dimethyl-2,6-methano-3-benzazocine Following a procedure similar to that described in Example 1A hereinabove, 3.7 g. of cyclobutanecarbonyl chloride and 5.8 g. of racemic 1,2,3,4,5,6-hexahydro-cis-6,11 - dimethyl-2,6-methano-3-benzazocine were interacted to produce 7.4 g. of racemic 1,2,3,4,5,6-hexahydro-3 - cyclobutanecarbonyl - cis-6,11-dimethyl-2,6-methano-3-benzazocine as a pale yellow syrup. This amide (7.4 g.) was reduced with lithium aluminum hydride (2.0 g.) in tetrahydrofuran for four hours to yield 5.8 g. of racemic 1,2,3,4,5,6 - hexahydro - 3 - cyclobutylmethyl-cis-6,11-dimethyl-2,6-methano-3-benzazocine, having the molecular formula $C_{19}H_{27}N$, a yellow syrup. This base was converted to its hydrochloride, which weighed 5.3 g. and melted at 270–271° C. (dec.). The solubility of the hydrochloride in water was less than 0.25 percent; it was soluble in 95 percent ethyl alcohol to the extent of 5 percent (w./v.); no precipitate formed when this solution was diluted with four volumes of water; the pH of the thus diluted solution was 6.1.

Example 5.—1,2,3,4,5,6 - hexahydro - 3-(3,3-dimethylcyclobutylmethyl) - 6,11-dimethyl-2,6-methano-3-benzazocine Following a procedure similar to that described in Example 1A hereinabove, racemic 1,2,3,4,5,6-hexahydrocis - 6,11 - dimethyl-2,6-methano-3-benzazocine was N-acylated with 3,3-dimethylcyclobutanecarbonyl chloride (obtained by interaction of 3,3-dimethylcyclobutanecarboxylic acid with thionyl chloride) to yield 10.7 g. of racemic 1,2,3,4,5,6 - hexahydro-3-(3,3-dimethylcyclobutanecarbonyl) - cis-6,11-dimethyl-2,6-methano-3-benzazocine as a viscous yellow syrup. This amide (10.7 g.) was reduced with lithium aluminum hydride (2 g.) in tetrahydrofuran to produce racemic 1,2,3,4,5,6-hexahydro-3-(3,3 - cyclobutylmethyl)-cis-6,11-dimethyl-2,6-methano-3-benzazocine having the molecular formula $C_{21}H_{31}N$. This base was converted to its hydrochloride, a white crystalline solid which weighed 9.3 g. and melted at 240–241° C. The solubility of this compound in water was 0.5 percent. The pH of the 0.5 percent aqueous solution was 6.8; when the pH was adjusted to 6.8 by addition of N/10 sodium hydroxide solution, a precipitate formed. In 95 percent ethyl alcohol, the solubility of the hydrochloride was 5 percent (w./v.); a precipitate formed when this solution was diluted with four volumes of water.

Example 6.—1,2,3,4,5,6 - hexahydro-3-cyclopentylmethyl-6,11-dimethyl-2,6-methano-3-benzazocine Using a procedure similar to that described in Example 1A hereinabove, 8.0 g. of racemic 1,2,3,4,5,6-hexahydro - cis-6,11-dimethyl-2,6-methano-3-benzazocine was N-acylated with 5.8 of cyclopentanecarbonyl chloride to produce 10.7 g. of racemic 1,2,3,4,5,6-hexahydro-3 - cyclopentanecarbonyl-cis-6,11-dimethyl-2,6-methano-3-benzazocine. This amide (10.7 g.) was reduced with lithium aluminum hydride (4 g.) in tetrahydrofuran for about five hours to produce racemic 1,2,3,4,5,6-hexahydro - 3 - cyclopentylmethyl-cis-6,11-dimethyl-2,6-methano - 3 - benzazocine, having the molecular formula $C_{20}H_{29}N$. This compound was treated with hydrochloric acid to convert it to the hydrochloride, a white crystalline solid which weighed 6.0 g. and melted at 246–249° C. The hydrochloride was soluble in water to the extent of 1.0 percent (cloudy solution). The pH of the 1.0 percent aqueous solution was 6.2, and a precipitate formed when the pH was adjusted to 6.3 by addition of N/10 sodium hydroxide solution.

Example 7.—1,2,3,4,5,6 - hexahydro - 3-(2-cyclopropylethyl)-6,11-dimethyl-2,6-methano-3-benzazocine When cyclopropaneacetyl chloride in equivalent amount is substituted for the cyclopropanecarbonyl chloride reactant in the N-acylation procedure in Example 1A, the amide product obtained is racemic 1,2,3,4,5,6-hexahydro - 3 - cyclopropaneacetyl - cis - 6,11 - dimethyl-2,6-methano-3-benzazocine; and reduction of this amide with lithium aluminum hydride in tetrahydrofuran yields racemic 1,2,3,4,5,6 - hexahydro-3-(2-cyclopropylethyl)-cis - 6,11-dimethyl-2,6-methano-3-benzazocine.

Example 8.—1,2,3,4,5,6 - hexahydro - 3 - (3-cyclopentylpropyl)-6,11-dimethyl-2,6-methano-3-benzazocine When cyclopentanepropionyl chloride in equivalent amount is substituted for the cyclopropanecarbonyl chloride reactant in the N-acylation procedure in Example 1A, the amide product obtained is racemic 1,2,3,4,5,6-hexahydro - 3-(cyclopentanepropionyl)-cis-6,11-dimethyl- 2,6-methano-3-benzazocine; and reduction of this amide with lithium aluminum hydride in tetrahydrofuran yields racemic 1,2,3,4,5,6 - hexahydro-3-(3-cyclopentylpropyl)-cis-6,11-dimethyl-2,6-methano-3-benzazocine.

Example 9.—1,2,3,4,5,6 - hexahydro - 3-(4-cyclohexylbutyl)-6,11-dimethyl-2,6-methano-3-benzazocine When cyclohexanebutyryl chloride in equivalent amount is substituted for the cyclopropanecarbonyl chloride reactant in the N-acylation procedure in Example 1A, the amide product obtained is racemic 1,2,3,4,5,6-hexahydro - 3 - (cyclohexanebutyryl)-cis-6,11-dimethyl-2,6-methano-3-benzazocine; and reduction of this amide with lithium aluminum hydride in tetrahydrofuran yields racemic 1,2,3,4,5,6 - hexahydro - 3 - (4-cyclohexylbutyl)-cis-6,11-dimethyl-2,6-methano-3-benzazocine.

Example 10.—1,2,3,4,5,6 - hexahydro - 3 - cyclopropylmethyl - 6,13 - dimethyl-2,6-methano-3-naphth[2,1-f]azocine A. A solution of 3.6 g. of cyclopropanecarbonyl chloride in 25 ml. of chloroform was dropped into a mixture of 8.3 g. of racemic 1,2,3,4,5,6-hexahydro-cis-6,13-dimethyl - 2,6 - methano-3-naphth[2,1-f]azocine, 50 ml. of dry chloroform, and 5 ml. of triethylamine at 10° C. with stirring. The reaction mixture was stirred for four hours at room temperature and was then washed successively with water, dilute hydrochloric acid, and water. The reaction mixture was then dried and concentrated under reduced pressure to yield 10.0 g. of racemic 1,2,3,4,5,6 - hexahydro-3-cyclopropanecarbonyl-cis-6,13-dimethyl - 2,6-methano-3-naphth[2,1-f]azocine as a light pink oil.

A mixture of 10.0 g. of racemic 1,2,3,4,5,6-hexahydro-3 - cyclopropanecarbonyl-cis-6,13-dimethyl-2,6-methano-3-naphth[2,1-f]azocine in 105 g. of tetrahydrofuran and 3 g. of lithium aluminum hydride in 45 ml. of tetrahydrofuran was stirred and refluxed for six hours. To the reaction mixture there was added 6 ml. of water, and the mixture was filtered. The filtrate was dried, and concentrated under reduced pressure. The viscous oil thus obtained, which weighed 9.6 g., was dissolved in 20 ml. of 95 percent ethyl alcohol, and 10 ml. of water was added to the solution, which was then refrigerated. The crystalline solid which separated from solution was collected on a filter. This product (8.1 g.) was recrystallized twice from ethyl alcohol-water to yield 5.0 g. of racemic 1,2,3,4,5,6-hexahydro - 3-cyclopropylmethyl-cis-6,13-dimethyl-2,6-methano-3-naphth[2,1-f]azocine, having the molecular formula $C_{22}H_{27}N$, which melted at 78–81° C. The solubility of this product in water was less than 0.25 percent, it was insoluble in dilute acid; and its solubility in 95 percent ethyl alcohol was 1 percent (w./v.).

B. Following the procedure of part A of this example but using the dextro form in one instance, and the levo form in another instance, of 1,2,3,4,5,6-hexahydro-cis-6,13-dimethyl - 2,6 - methano-3-naphth[2,1-f]azocine (resolved into the dextro and levo forms using d- and l-tartaric acids) instead of the racemic form used in part A, the respective final products are the dextro- and the levo- forms of 1,2,3,4,5,6 - hexahydro-3-cyclopropylmethyl-cis-6,13-dimethyl-2,6-methano-3-naphth[2,1-f]azocine.

Example 11.—1,2,3,4,5,6-hexahydro-3-cyclopropylmethyl-6,13-dimethyl-2,6-methano-3-naphth[2,1-f]azocine Following a procedure similar to that described in part A of Example 10 hereinabove, 7.4 g. of racemic 1,2,3,4,5,6 - hexahydro-trans-6,13-dimethyl-2,6-methano-3-naphth[2,1-f]azocine in 50 ml. of chloroform and 4.5 ml. of triethylamine was N-acylated with 3.1 g. of cyclopropanecarbonyl chloride in 25 ml. of chloroform to yield 4.0 g. of racemic 1,2,3,4,5,6-hexahydro-3-cyclopropanecarbonyl - trans - 6,13-dimethyl-2,6-methano-3-naphth-[2,1-f]azocine which melted at 134–136° C. This amide (2.8 g.) was reduced with lithium aluminum hydride (1 g.) in tetrahydrofuran to yield 3.6 g. of racemic 1,2,3,4,5,6 - hexahydro-3-cyclopropylmethyl-trans-6,13-dimethyl-2,6-methano-3-naphth[2,1-f]azocine, having the molecular formula $C_{22}H_{27}N$. This base was converted to its hydrochloride, a white crystalline solid which melted at 249–252° C. (dec.). The solubility of the hydrochloride in water was less than 0.25 percent; it was soluble in 95 percent ethyl alcohol to the extent of 1 percent and when the 1 percent solution was diluted with four volumes of water a precipitate formed.

Example 12.—1,2,3,4,5,6-hexahydro-3-cyclobutylmethyl-6,13-dimethyl-2,6-methano-3-naphth[2,1-f]azocine Following a procedure similar to that described in part A of Example 10 hereinabove, 8.3 g. of racemic 1,2,3,4,5, 6 - hexahydro-cis-6,13-dimethyl-2,6-methano-3-naphth[2, 1-f]azocine in 50 ml. of chloroform and 5 ml. of triethylamine was N-acylated with 4.2 g. of cyclobutanecarbonyl chloride in 25 ml. of chloroform to yield 11.2 of racemic 1,2,3,4,5,6 - hexahydro-3-cyclobutanecarbonyl-cis-6,13-dimethyl-2,6-methano-3-naphth[2,1-f]azocine. This amide (11 g.) was reduced with lithium aluminum hydride (3.5 g.) in tetrahydrofuran to yield 5.7 g. of racemic 1,2,3,4, 5,6 - hexahydro-3-(cyclobutylmethyl)-cis-6,13-dimethyl-2,6-methano-3-naphth[2,1-f]azocine, having the molecular formula $C_{23}H_{29}N$, in the form of white crystals which melted at 80–83° C. The solubility of this compound in water was less than 0.25 percent; it was soluble in 95 percent ethyl alcohol to the extent of 1 percent (w./v.), and when four volumes of water was added to the 1 percent solution, a precipitate formed.

Example 13.—1,2,3,4,5,6 - hexahydro - 3-(2-cyclopropylethyl)-6,13-dimethyl-2,6-methano-3-naphth[2,1-f]azocine When cyclopropaneacetyl chloride in equivalent amount is substituted for the cyclopropanecarbonyl chloride reactant in the N-acylation procedure in part A of Example 10, the amide product obtained is racemic 1,2,3,4,5,6-hexahydro - 3 - cyclopropaneacetyl-cis-6,13-dimethyl-2,6-methano-3-naphth[2,1-f]azocine; and reduction of this amide with lithium aluminum hydride in tetrahydrofuran yields racemic 1,2,3,4,5,6-hexahydro-3-(2-cyclopropylethyl) - cis - 6,13-dimethyl 2,6-methano-3-naphth[2,1-f]azocine.

The following are further illustrative examples of the compounds of Formulas I and II which are obtained by proceeding in accordance with the methods hereinabove described:

1,2,3,4,5,6-hexahydro-3-(cyclohexylmethyl)-6,11-dimethyl-2,6-methano-3-benzazocine;
1,2,3,4,5,6-hexahydro-3-(2-cyclohexylpropyl)-6,11-dimethyl-2,6-methano-3-benzazocine;
1,2,3,4,5,6-hexahydro-3-cyclopropylmethyl-6-(n-propyl)-11-methyl-2,6-methano-3-benzazocine;
1,2,3,4,5,6-hexahydro-3-(4-cyclopropylbutyl)-6,11-dimethyl-2,6-methano-3-benzazocine;
1,2,3,4,5,6-hexahydro-3-cyclopropylmethyl-6,11-diethyl-2,6-methano-3-benzazocine;
1,2,3,4,5,6-hexahydro-3-cyclopropylmethyl-6-methyl-2,6-methano-3-benzazocine;
1,2,3,4,5,6-hexahydro-3-(3-cyclopropylpropyl)-6,11-dimethyl-2,6-methano-3-benzazocine;
1,2,3,4,5,6-hexahydro-3-(2-cyclopropylpropyl)-6,13-dimethyl-2,6-methano-3-naphth[2,1-f]azocine;
1,2,3,4,5,6-hexahydro-3-cyclopropylmethyl-6-ethyl-13-methyl-2,6-methano-3-naphth[2,1-f]azocine;
1,2,3,4,5,6-hexahydro-3-(4-cyclohexylbutyl)-6-ethyl-2,6-methano-3-naphth[2,1-f]azocine;
1,2,3,4,5,6-hexahydro-3-(3-cyclobutylpropyl)-6-n-propyl-13-methyl-2,6-methano-3-naphth[2,1-f]azocine.

Compounds of Formulas I and II hereinabove which were prepared as described in the foregoing examples were found to be active in one or both of two different standard anti-convulsant screening tests in mice, namely in anti-maximal electroshock seizures and in anti-maximal pentylenetetrazol seizures. In the anti-maximal electroshock seizure test, the compounds were administered intraperitoneally or perorally thirty or ninety minutes prior to the application of 50 milliamperes of alternating current through corneal electrodes. Shock duration was 0.3 second. The criterion for anticonvulsant activity was the absence of the tonic hind leg extensor component of the seizure. In the anti-maximal pentylenetetrazol seizure test, the compounds were given intraperitoneally thirty or ninety minutes prior to the rapid intravenous injection of 50 mg. per kg. of pentylenetetrazol. Failure to display tonic hind leg extensor seizures was again the criterion for drug action. Representative results, expressed as $ED_{50}$ (mg./kg.), which were obtained with my new compounds in these two tests are as follows:

1250 ml. of anhydrous diethyl ether was added slowly over a period of approximately two and one-half hours to a refluxing mixture of 258 ml. of anhydrous diethyl ether and 37.2 g. of magnesium turnings. The liquid in the reaction mixture was then siphoned away from the solid, which remained at the bottom of the reaction vessel, into a solution of 376 g. of 3,4-dimethylpyridine methiodide in 1500 ml. of anhydrous diethyl ether. The resulting mixture was then stirred for approximately ten minutes, and the reaction mixture thus obtained was poured into a mixture of ice and water having approximately 50 g. of ammonium chloride dissolved therein. When the mixture was made basic by addition of 500 ml. of concentrated ammonium hydroxide, two layers formed, a lower, aqueous layer and an upper, ethereal layer. The

| Cpd. of Ex. No. | Anti-Maximal Electroshock | | | | Anti-Maximal Pentylenetetrazol | | | |
|---|---|---|---|---|---|---|---|---|
| | PO | | IP | | PO | | IP | |
| | 30' | 90' | 30' | 90' | 30' | 90' | 30' | 90' |
| 1A | 26.2±7 | 35.5±3 | 11.2±2 | Inact. | 3.3±.8 | 6.2±1 | 2.3±7 | 5.3±10 |
| 4 | Inactive | | 30.5±5.8 | Inact. | Inact. | 25.8±7 | 13.2±3 | 26.2±8.1 |
| 6 | Inactive | | | | Inactive | | 11.7±2 | 8±3 |

These compounds were inactive when tested for analgesic activity in rats in a modified D'Amour-Smith test procedure, and they did not potentiate subhypnotic doses of hexobarbital in mice.

The results of representative further biological tests using the product of Example 1A, namely racemic 1,2,3,4,5,6-hexahydro-3 - cyclopropylmethyl-cis-6,11-dimethyl-2,6-methano-3-benzazocine, were as follows:

Against minimal pentylenetetrazol seizures, wherein the dose of pentylenetetrazol was only 32.5 mg./kg. (intravenously) and the ensuing convulsions were clonic, without a tonic hind leg extensor component, the oral $ED_{50}$ values were: 30 minutes post-medication, 15±4 mg./kg.; 90 minutes post-medication, 37±6 mg./kg.

The compound induced diuresis in mice at dose levels of 12.5 mg./kg. and 25 mg./kg.

Sixty minutes after oral medication, 50 percent of the mice tested had fallen from a 60° inclined screen at a dose of 38.2±11 mg./kg. The $ED_{50}$ for intraperitoneal administration was 17.2 mg./kg.

In a toxicology study, monkeys were medicated orally with 5 mg./kg. and 25 mg./kg. of the test compound each day for five days. The lower dose was well tolerated. Some ataxia with a decrease in activity was observed. At 25 mg./kg. there was a more marked decrease in spontaneous activity along with ataxia and salivation. There was considerable variability among the monkeys in the magnitude of the response. Symptoms lasted two to five hours. Some weight loss occurred. Blood SGO-T, alkaline phosphatase, and BUN were all normal. Acute toxicity tests gave the following results:

| Route | $LD_{50}$±s.e., mg./kg. | Species | Time |
|---|---|---|---|
| I.V. | 20±1 | Mouse | 24 hr. |
| I.V. | 20±1 | do | 7 day. |
| P.O. | 155±17 | do | 24 hr. |
| P.O. | 155±17 | do | 7 day. |
| I.P. | 65±7 | do | 24 hr. |
| I.P. | 65±7 | do | 7 day. |
| I.V. | 17±1 | Rat | 24 hr. |
| I.V. | 17±1 | Rat | 7 day. |
| P.O. | $ALD_{50}$200 | Rat | 24 hr. |
| P.O. | $ALD_{50}$200 | Rat | 7 day. |

INTERMEDIATES

The preparation of the novel 1,2,3,4,5,6-hexahydro-cis and trans - 6-($R^1$)-13-($R^2$)-2,6-methano-3-naphth[2,1-f]azocine starting materials and intermediates thereto is illustrated below.

A. A solution of 274 g. of 1-naphthylmethyl chloride in ethereal layer was then separated from the aqueous layer and was filtered. The filtrate was concentrated to yield 267 g. of 2-(1-naphthylmethyl)-1,3,4-trimethyl-1,2-dihydropyridine as a red oil. This oil was dissolved in 1 liter of ethanol, and to this solution there was gradually added at 15–20° C., with stirring, 28 g. of sodium borohydride in 240 ml. of water. The reaction mixture was stirred at room temperature for four hours, and then the ethanol was distilled from the reaction mixture under reduced pressure, leaving a nearly dry residue. To this residue were added water, hydrochloric acid, and diethyl ether. Three layers formed in the mixture. The uppermost, ethereal layer was separated and discarded. The two lower layers were made basic by addition of potassium carbonate, and the mixture was then extracted with diethyl ether. The ethereal extract was dried, and concentrated under reduced pressure, and the residue was distilled. The fraction distilling at 148–156° C. at 0.2–0.6 mm. pressure, which weighed 148 g., was 2-(1-naphthylmethyl)-1,3,4-trimethyl-1,2,5,6-tetrahydropyridine.

A mixture of 147 g. of 2-(1-naphthymethyl)-1,3,4-trimethyl-1,2,5,6-tetrahydropyridine and 1500 ml. of concentrated (48 percent) hydrobromic acid was refluxed for approximately twenty-four hours. The reaction mixture was concentrated under reduced pressure, and the resulting residue was partitioned between water (2 liters) and ethyl acetate (400 ml.), the ethyl acetate layer being discarded. The aqueous layer was made basic by addition of potassium carbonate and the mixture was then extracted with diethyl ether. The ethereal extract was dried, and concentrated under reduced pressure to yield 134 g. of a dark oil. This oil was dissolved in 100 ml. of acetone, and the solution was chilled. The solid which formed was collected on a filter, washed with a few ml. of acetone, and dried. There was thus obtained 89.9 g. of solid which melted at 55–73° C. This product was combined with a 31 g. portion of the same product from another run, and the combined solid was fractionated, using column chromatography (silica-benzene) to yield the racemic cis (M.P. 81° C.) and racemic trans (M.P. 135° C.) forms of 1,2,3,4,5,6 - hexahydro - 3 - methyl - 6,13 - dimethyl-2,6-methano-3-naphth[2,1-f]azocine; these assignments of configuration were confirmed by nuclear magnetic resonance spectra.

B. A solution of 42 g. of racemic 1,2,3,4,5,6-hexahydro - 3 - methyl - cis - 6,13 - dimethyl - 2,6 - methano-3-naphth[2,1-f]azocine in 210 ml. of chloroform was added dropwise with stirring to a solution of 17 g. of cyanogen bromide in 170 ml. of chloroform at room temperature. The resulting mixture was refluxed for three hours. The reaction mixture was then concentrated under reduced pressure to yield an orange-colored oil which consisted chiefly of racemic 1,2,3,4,5,6-hexahydro-3-cyano - cis - 6,13 - dimethyl - 2,6 - methano - 3 - naphth [2,1-f]azocine. To this oil there were added 105 ml. of concentrated hydrochloric acid and 535 ml. of water, and the mixture was refluxed for about twenty-four hours. The reaction mixture was then concentrated under reduced pressure, diethyl ether and a small volume of water were added, and the ether layer was separated from the mixture. The residue was stirred with a mixture of diethyl ether, water, and ammonium hydroxide for one hour. The mixture was filtered to remove a small amount of solid, and the ethereal and aqueous layers in the filtrate were separated. The ethereal layer was dried and then concentrated under reduced pressure to yield 30.5 g. of brown oil as a residue. This oil was distilled to obtain a fraction weighing 28.1 g. which distilled at 151–154° C. at 0.4–0.6 mm. pressure. A small amount of this product, which was racemic 1,2,3,4,5,6 - hexahydro - cis - 6,13-dimethyl - 2,6 - methano - 3 - naphth[2,1-f]azocine, was converted to its hydrochloride, the latter being a white crystalline solid which melted at 283–287° C.

C. A solution of 15 g. of racemic 1,2,3,4,5,6-hexahydro - 3 - methyl - trans - 6,13 - dimethyl - 2,6 - methano-3-naphth[2,1-f]azocine in 75 ml. of chloroform was added dropwise with stirring to a solution of 6.1 g. of cyanogen bromide in 60 ml. of chloroform at room temperature. The resulting mixture was refluxed with stirring for three hours. The reaction mixture was then concentrated under reduced pressure to yield 24.1 g. of racemic 1,2,3,4,5,6 - hexahydro - 3 - cyano - trans - 6,13 - dimethyl-2,6-methano-3-naphth[2,1-f]azocine as an oil. To this oil there were added 190 ml. of water and 38 ml. of concentrated hydrochloric acid, and the mixture was refluxed for twenty-four hours. The reaction mixture was then concentrated under reduced pressure, water and diethyl ether were mixed with the resulting mixture, and thereafter the ether was removed by evaporation under reduced pressure. The mixture was made basic by addition of ammonium hydroxide and was then extracted with diethyl ether while stirring for a period of one hour. The ethereal extract was dried, concentrated under reduced pressure, and distilled. The fraction distilling at 153–156° C. at 0.5 mm. pressure weighed 8.5 g. A small amount of this product, which was racemic 1,2,3,4,5,6-hexahydro-trans-6,13 - dimethyl - 2,6 - methano - 3 - naphth[2,1-f]azocine, was converted to its hydrochloride, the latter being a white crystalline solid which melted at 329–337° C.

The subject matter which I regard as my invention is particularly pointed out and distinctly claimed as follows:

1. 1,2,3,4,5,6 - hexahydro - 3 - (cycloalkyl - lower alkylene-) - 6 - ($R^1$) - 13 - ($R^2$) - 2,6 - methano - 3-naphth[2,1-f]azocine, wherein $R^1$ is lower alkyl and $R^2$ is a member of the group consisting of hydrogen and lower alkyl.

2. 1,2,3,4,5,6 - hexahydro - 3 - (cycloalkyl - lower alkylene-) - 6 - ($R^1$) - 13 - ($R^2$) - 2,6 - methano - 3-naphth[2,1-f]azocine, wherein each of $R^1$ and $R^2$ is lower alkyl.

3. 1,2,3,4,5,6 - hexahydro - 3 - (cyclopropyl - lower alkylene-) - 6 - ($R^1$) - 13 - ($R^2$) - 2,6 - methano - 3-naphth[2,1-f]azocine, wherein each of $R^1$ and $R^2$ is lower alkyl.

4. 1,2,3,4,5,6 - hexahydro - 3 - cyclopropylmethyl - 6-lower alkyl - 13 - methyl - 2,6 - methano - 3 - naphth [2,1-f]azocine.

5. 1,2,3,4,5,6 - hexahydro - 3 - cyclopropylmethyl - 6-13-dimethyyl-2,6-methano-3-naphth[2,1-f]azocine.

6. 1,2,3,4,5,6 - hexahydro - 3 - cyclobutylmethyl - 6,13-dimethyl-2,6-methano-3-naphth[2,1-f]azocine.

7. 1,2,3,4,5,6 - hexahydro - 3 - (Y) - 6 - ($R^1$) - 13-($R^2$)-2,6-methano-3-naphth[2,1-f]azocine, wherein $R^1$ is lower alkyl, $R^2$ is a member of the class consisting of hydrogen and lower alkyl, and Y is a member of the group consisting of hydrogen, methyl, cycloalkanoyl, and cycloalkyl-lower alkanoyl.

8. 1,2,3,4,5,6 - hexahydro - 6,13 - dimethyl - 2,6-methano-3-naphth[2,1-f]azocine.

9. 1,2,3,4,5,6-hexahydro - 6 - ethyl - 13 - methyl - 2,6-methano - 3 - naphth[2,1-f]azocine.

References Cited

UNITED STATES PATENTS

| | | | |
|---|---|---|---|
| 3,138,603 | 6/1964 | May | 260—294.3 |
| 3,264,310 | 8/1966 | Shavel | 260—293 |

OTHER REFERENCES

May et al.: J. Org. Chem. vol. 24, pp. 1435–1437, October 1959.

JOHN D. RANDOLPH, *Primary Examiner.*

WALTER A. MODANCE, *Examiner.*

A. D. SPEVACK, *Assistant Examiner.*